United States Patent

Heckendorf et al.

[15] 3,641,826

[45] Feb. 15, 1972

[54] OMNIDIRECTIONAL SENSOR

[72] Inventors: Howard A. Heckendorf, Brookfield; Donald A. Voorhies, Wauwatosa, both of Wis.

[73] Assignee: General Motors Corporation, Detroit, Mich.

[22] Filed: May 8, 1970

[21] Appl. No.: 35,767

[52] U.S. Cl. ............................................................73/514
[51] Int. Cl. .....................................................G01p 15/02
[58] Field of Search..........................73/492, 514; 200/61.45

[56] References Cited

UNITED STATES PATENTS 3,270,159   8/1966   Soos .........................200/61.45 M UX Primary Examiner—James J. Gill
Attorney—W. E. Finken and Herbert Furman

[57] ABSTRACT

An operator is slidably mounted in a guide tube and resiliently biased toward actuated position. A plurality of balls are received within radial bores in the operator which open to an axial bore. A control rod is moved within the bore to force the balls outwardly of the radial bores and into engagement with a radial shoulder of a support to retain the operator in nonactuated position. A seismic mass seats on the support and mounts a permanent magnet. The mass controls the movement of the pin out of the axial bore of the operator. The magnetic flux between the magnet and support maintains the seismic mass in seated position. An acceleration pulse of predetermined amplitude and time applied to the seismic mass tilts the mass relative to the support to move the pin out of the axial bore of the operator. When the pin is moved outwardly of the axial bore by tilting of the seismic mass, the balls are released from engagement with the support shoulder for movement within the radial bores and movement with the operator to actuated position. A manual member is movable between a first position wherein it blocks tilting movement of the seismic mass and a second position wherein it permits such movement. In the first position the manual member completes a circuit across a source of power and a light indicating that the sensor is in inoperative condition. In the second position, the manual member does not complete the circuit.

8 Claims, 6 Drawing Figures

PATENTED FEB 15 1972
3,641,826
SHEET 1 OF 2
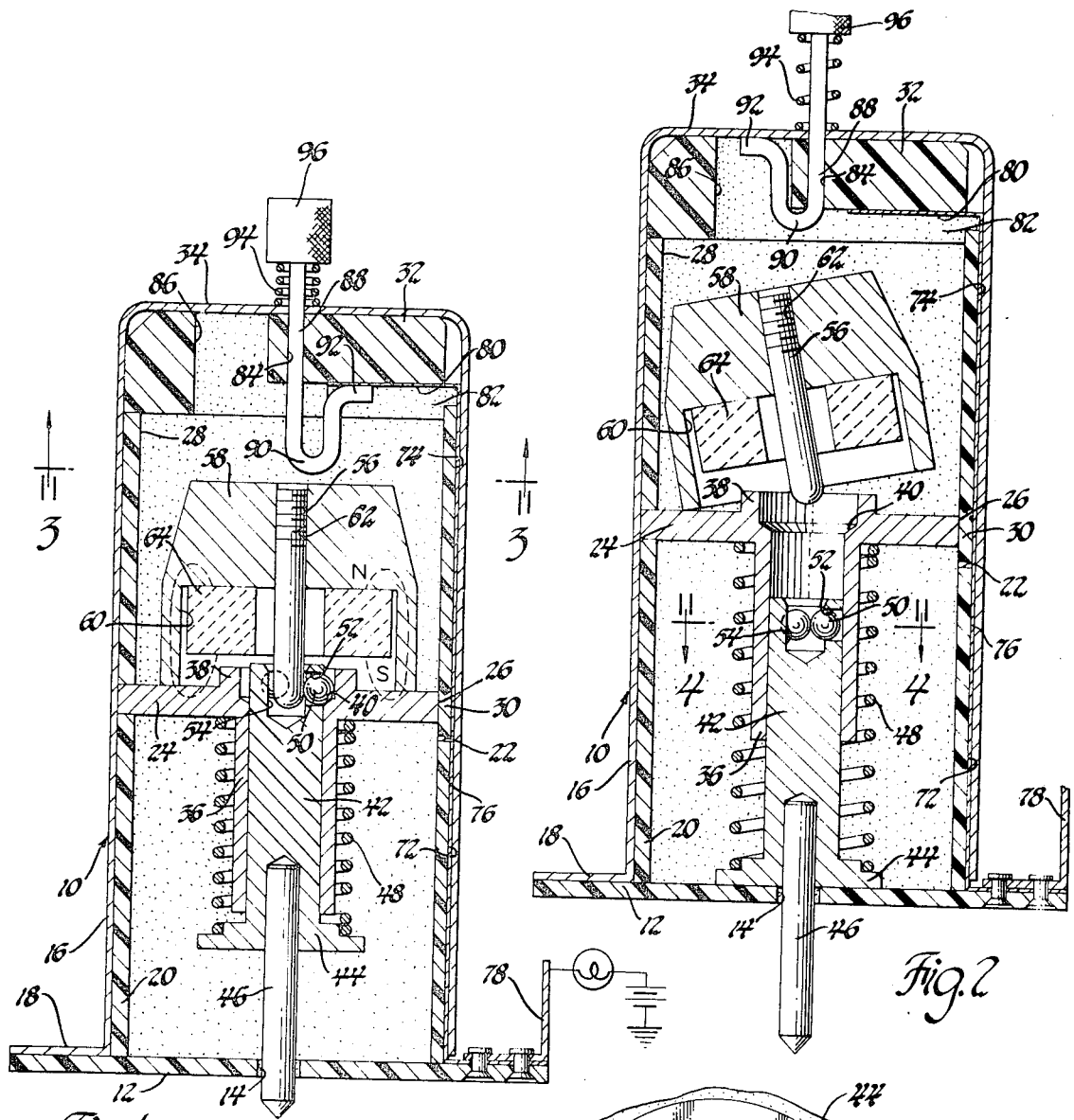
Fig.1
Fig.2
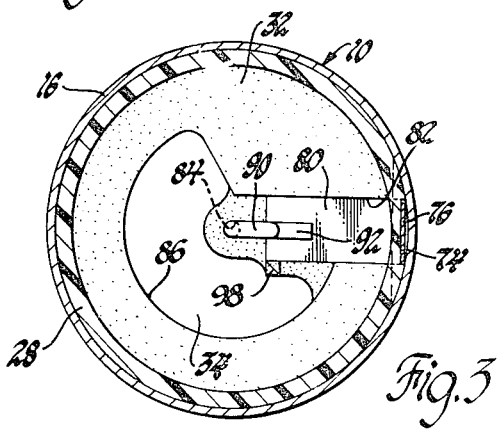
Fig.3
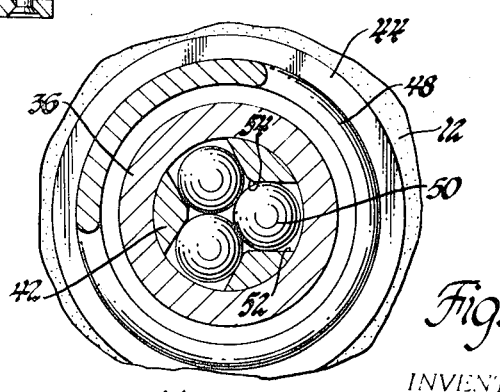
Fig.4
INVENTORS
Howard A. Heckendorf, &
Donald A. Voorhies
BY Herbert Furman
ATTORNEY INVENTORS
Howard A. Heckendorf,
& Donald A. Voorhies Herbert Furman
ATTORNEY

OMNIDIRECTIONAL SENSOR

This invention relates to sensors and more particularly to omnidirectional sensors of the type including a seismic mass controlling the release of an operator to actuated position when the mass is subjected to an acceleration pulse of predetermined amplitude and time.

One of the features of this invention is that the operator is biased to actuated position and is maintained in nonactuated position by detent means, with the detent means being released by the movement of the seismic mass against a magnetic flux of predetermined strength when the seismic mass is subjected to an acceleration pulse of predetermined amplitude and time. Another feature of this invention is that the magnetic flux maintains the seismic mass seated on a support which guides the operator for movement between nonactuated and actuated positions. A further feature of this invention is that the sensor can be reset externally thereof by moving the operator and the support and seated mass relative to each other when the operator is in actuated position. Yet another feature of this invention is that a member is manually movable between blocking and unblocking positions with respect to the seismic mass and performs an additional function in blocking position of completing a circuit indicating that the sensor is in an unarmed condition.

These and other features of this invention will be readily apparent from the following specification and drawings wherein:

FIG. 1 is a sectional view showing the sensor in unactuated position;

FIG. 2 is a view showing the sensor in actuated position;

FIG. 3 is a sectional view taken generally along the plane indicated by line 3—3 of FIG. 1;

FIG. 4 is a sectional view taken generally along the plane indicated by line 4—4 of FIG. 2;

Figure 5:
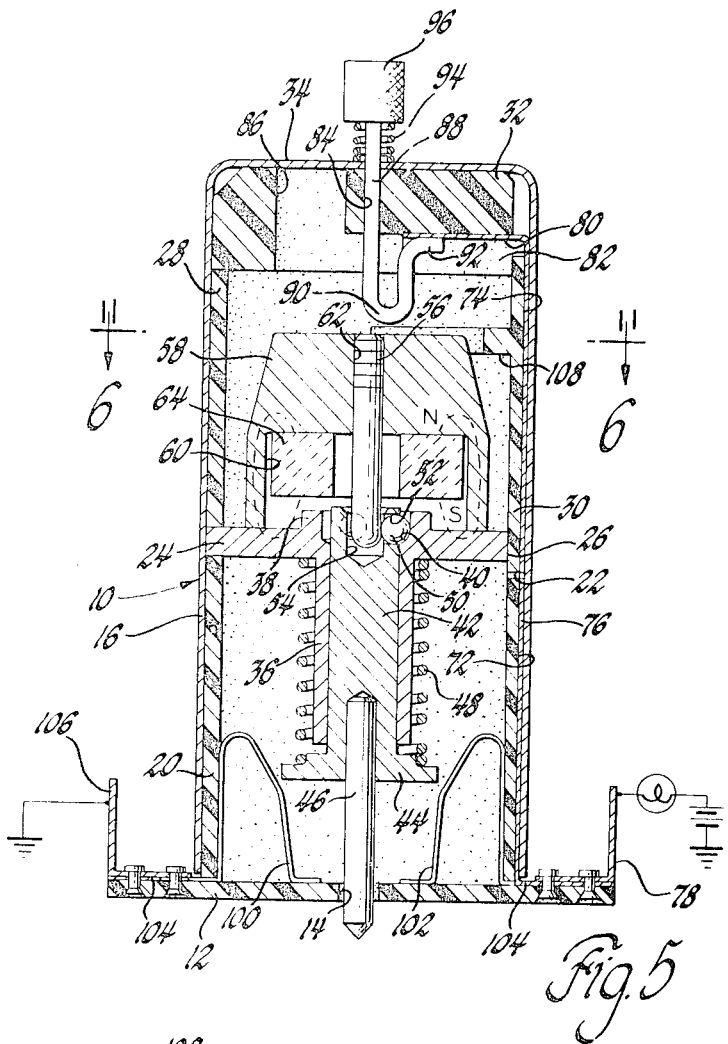
FIG. 5 is a view similar to FIG. 1 showing a modification of the invention.

Referring now particularly to FIGS. 1 and 2, the sensor 10 includes a circular base 12 of insulating material which is centrally apertured at 14. A cylindrical housing 16 of conductive material includes a radial flange 18 at its open end which seats on the base 12.

A cylindrical sleeve or member 20 of plastic material fits within the housing 16 and has its lower edge seating on the base 12. A chordal portion of the upper edge of the member 20 is cut away to provide a groove 22. A circular support member 24 of conductive material seats on the upper edge of the member 20. A chordal portion of the member 24 is cut away to provide an opening 26 aligned with groove 22. A cylindrical sleeve or member 28 of insulating material has its lower edge seating on the support 24 and includes an extension 30 which extends through the opening 26 of the member 24 and into the groove 22. The groove 22, opening 26, and extension 30 provide an index arrangement between the members 20, 24, and 28 for a purpose to be hereinafter described. A generally cylindrical member 32 of insulating material fits between the apertured end wall 34 of the housing 16 and the upper edge of the member 28.

The support member 24 includes a depending cylindrical extension or guide tube 36 and an upwardly extending cylindrical flange 38 of greater ID than the tube 36 and opening thereto across a radially and axially extending annular shoulder 40. A cylindrical operator 42 of conductive material is slidably mounted within the guide tube 36 and includes a lower stepped cylindrical flange 44. A pin 46 is force fitted within a bore in the lower end of the operator and projects partially outwardly of the base 12 through the aperture 14. A coil compression spring 48 seats between the flange 44 and the support member 24 to bias the operator 42 downwardly or outwardly of the guide tube 36 toward the actuated position shown in FIG. 2, wherein flange 44 engages base 12.

A ball 50 is received within each of three radial bores 52 in the upper end of the operator 42. Bores 52 open outwardly of the operator to flange 38 and shoulder 40 and also open to an axial bore 54 of the operator. When the balls 50 are located as shown in FIG. 1, in engagement with the wall of a respective bore and the shoulder 40 of support 24, the operator 42 will be maintained in its unactuated position against the action of spring 48. Normally the balls 50 are maintained in this position by the tangential engagement of the balls with an axially movable control rod 56 which projects inwardly of the operator 42 and within the bore 54. When the control rod 56 is axially withdrawn out of tangential engagement with the balls 50, the spring 48 and the camming action of the shoulder 40 force the balls 50 inwardly of the operator for movement therewith as the operator moves to its actuated position shown in FIG. 2.

A generally frustoconically shaped seismic mass 58 seats on the support member 24 and includes a bore 60 which opens to the support member 24. A bore 62 of smaller diameter than bore 60 opens thereto and is threaded. The control rod 56 extends within the bore 62 in adjustable threaded engagement therewith.

A cylindrical permanent magnet 64 is suitably secured to the base wall of the bore 60 and the magnetic flux of this magnet is schematically indicated in FIG. 1. Although the side wall of the bore 60 is spaced from the outer surface of the annular magnet, this is not necessary since the action of the magnet in controlling the actuation of the sensor is not dependent on the presence or absence of an airgap between the magnet and the mass. Likewise, although the magnet is shown with its north pole located at the base wall of bore 60 and its south pole spaced from the outer surface of support member 24, it could likewise be reversely oriented.

The magnetic flux exerted by the magnet 64 normally maintains the mass 58 seated on the support 24 and likewise maintains the rod 56 within bore 54 in tangential engagement with the balls 50 to maintain the operator in unactuated position, as shown in FIG. 1. It will be noted that the free end of rod 56 is semispherically shaped, although it could be tapered. The axial distance between a radial plane containing the points of tangency of balls 50 with rod 56 and a radial plane through the base of the free end is the integrating distance. Rod 56 must move through this distance in order to release balls 50 from shoulder 40 and release actuator 42 for movement to actuated position.

Upon the application of an acceleration pulse of predetermined amplitude and time to the mass 58, the force of the magnetic flux exerted by the magnet 64 on the support member 24 will be overcome and the mass 58 will then tilt relative to the support member 24 as shown in FIG. 2. The tilting of the mass 58 moves rod 56 through the integrating distance by moving the rod axially outwardly of bore 54. When rod 56 has moved through the integrating distance, the force of spring 48 and the camming action of shoulder 40 cam the balls 50 inwardly of the operator 42 and within the passages 52 to release the operator for movement to actuated position. The guide tube 36 maintains the balls 50 within the operator as it moves to actuated position, with the balls tangentially engaging each other as shown in FIG. 4. The integrating distance can be adjusted by adjusting rod 56 relative to the seismic mass. This presets the included angle which must result between the axis of the operator 42 and the axis of the seismic mass if the seismic mass is to move the rod through the integrating distance and release the operator 42. Likewise the weight of the seismic mass, including the magnet 64, and the strength of this magnet must also be preset in order to ensure that the operator 42 is not released unless the acceleration pulse is of the required amplitude and time.

If the acceleration pulse is not of the required amplitude and time, the mass 58 will either remain stationary or move through an included angle insufficient to move rod 56 through the integrating distance. The sensor is omnidirectional since the pulse can come from any direction normal or generally normal to the axis of the mass 58 and the mass is symmetrical about this axis.

The sensor 10 may be reset by engaging the pin 46 with a rod and moving the operator 42 upwardly from its position shown in FIG. 2 to its position shown in FIG. 1. When the balls 50 engage the spherical end of rod 56, the seismic mass 58 will be slightly tilted relative to the support member 24 until the passages 52 move into radial alignment with shoulder 40 and flange 38. At this time the rod 56 will move the balls 50 outwardly of passages 52 to their position shown in FIG. 1 as the seismic mass 58 returns to its seated position. Thus the sensor 10 can be reset externally thereof.

The sensor 10 is specifically intended for use in a vehicle air cushion restraint system. Such a system may include a fluid-filled pressure vessel sealed by a rupturable diaphragm, an inflatable bag or cushion and a manifold connecting the vessel and the cushion. The pin 46 may directly rupture the diaphragm or actuate a detonator to rupture the diaphragm. The pin or operator 42 may initiate rupture of the diaphragm by closing a switch to electrically fire a squib or detonator which ruptures the diaphragm. Rupture of the diaphragm releases the contents of the pressure vessel and inflates the cushion when the vehicle is subjected to conditions which apply an acceleration pulse of predetermined amplitude and time to the seismic mass. The sensor may be used equally as well with pure pyrotechnic or combination fluid and pyrotechnic systems to electrically fire a squib in the vessel and in turn fire the pyrotechnic material.

As previous described, the members 20 and 28 are oriented in a predetermined position with respect to each other when they are assembled with the support 24 to the housing 16. This orientation is necessary in order that shallow axially extending grooves 72 and 74 in the outer surfaces of members 20 and 28 can be aligned with each other and with the opening in member 24 so as to receive therewithin a very thin insulated flat wire or lead 76 which is electrically connected to an outer terminal 78, riveted to base 12, and extends through a shallow slot in the lower edge of housing 16 into groove 72. The upper exposed end 80 of wire 76 is secured in a suitable manner to the base wall of a channel 82 of the block 32. Contact 78 is connected across a source of power and a light, as schematically indicated in FIG. 1, and provides an indication to the operator that the sensor is in unarmed condition, as will be further described.

As best shown in FIG. 3, the channel 82 extends across a central bore 84 in the block 32 and terminates at an arcuate opening or slot 86 which extends completely through the block. A rod member or combined blocking and contact member 88 is rotatably mounted in the bore 84 and includes a bight portion 90 which terminates in a lateral leg 92. A compression spring 94 seats between a manual knob 96 of member 88 and the upper wall 34 of housing 16 as shown in FIG. 1. When the member 88 is located as shown in FIG. 1, the bight portion 90 prevents tilting movement of the seismic mass 58 through the required included angle required to release operator 42 and thus maintains the sensor 10 in an unarmed condition. Likewise the engagement of leg 92 with the exposed end 80 of wire 76 completes the circuit across the indicator light and source of power to energize the light.

As shown in FIG. 3, the base wall of channel 82 includes a lateral pointed detent 98 which lies in the path of rotational movement of leg 92. Detent 98 blocks rotational movement of member 88 without first requiring axial movement of this member as will now be described. When it is desired to place the sensor 10 in an armed or operating condition, the operator grasps the knob 96 and moves the member 88 axially inwardly of the sensor 10. This moves the leg 92 out of engagement with the exposed end 80 of wire 76 and also below the detent 98. The member 94 can then be rotated until the leg 92 is aligned with opening 92. The operator then releases knob 96 and spring 94 locates member 88 as shown in FIG. 2 with leg 92 seating on the wall 34 of the housing 16. The bight portion 90 is then located out of blocking relationship to the seismic mass 58 and the indicator light is deenergized.

Figure 6:
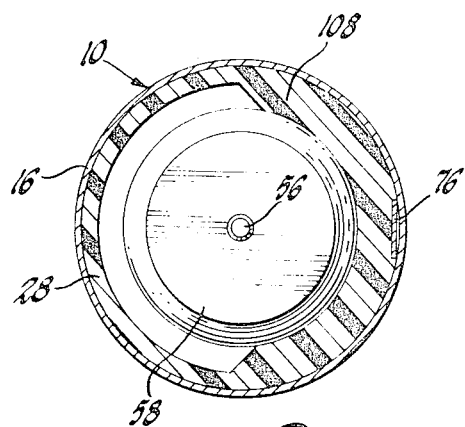
FIG. 6 is a sectional view taken generally along the plane indicated by line 6—6 of FIG. 5.

FIGS. 5 and 6 show a modified sensor. Generally this sensor is the same as that shown in FIGS. 1 through 4, inclusive, and accordingly, only the modifications will be particularly described.

The sensor 10, shown in FIGS. 5 and 6, includes a pair of like flat leaf spring electrical contacts 100 and 102, each of which includes a leg 104 extending outwardly through a slot in the lower edge of the member 20. The leg 104 of contact 102 is electrically connected to the terminal 78 and the leg 104 of the contact 100 is electrically connected to a like terminal 106. The terminal 106 is grounded as indicated. When the operator 42 moves to its actuated position, the flange 44 thereof will engage both of the contacts 100 and 102 to close the circuit across the indicator light and indicate that the sensor has been actuated. Likewise, contacts 100 and 102 may control a circuit which fires a detonator or similar device when the sensor is actuated.

The sensor 10 also includes a radial flange 108 which extends over a portion of the inner surface of the member 28 and is formed integral therewith. The flange 108 blocks tilting movement of the mass 58 so that the mass can be made responsive to acceleration impulses only in certain directions rather than being responsive to acceleration impulses in all directions normal to its axis. The extent of the flange 108 may be varied as desired and likewise, of course, the flange need not be continuous but could be segmented if desired.

It should also be noted that although the mass 58 is shown as being symmetrical about its axis, it can be asymmetrically shaped, such as, for example, being of oval or elliptical cross section, and can be of irregular shape. The shape of the mass, of course, controls tilting movement of the mass under an acceleration pulse. If the mass is other than of symmetrical shape, the value of the acceleration pulse required to tilt the mass will, of course, vary with direction.

Thus, this invention provides an improved omnidirectional sensor.

We claim:

1. A sensor comprising, a support including axial guide means, an operator mounted on the guide means for axial movement relative thereto between first and second positions, means biasing the operator to the second position, detent means movable between detented and undetented positions and engageable in detented position with the operator to hold the operator in the first position, a seismic mass movably mounted on the support, means operatively connecting the mass to the detent means for movement of the detent means to undetented position to release the operator for movement to the second position upon movement of the seismic mass relative to the support, and magnetic means exerting a magnetic flux of predetermined strength between the mass and support to retain the seismic mass against movement relative to the support, an acceleration pulse of predetermined amplitude and time moving the seismic mass relative to the support against the flux of the magnetic means.

2. A sensor comprising, a support including axial guide means, an operator mounted on the guide means for axial movement relative thereto between first and second positions, means biasing the operator to the second position, detent means movable between detented and undetented positions and engageable in detented position with the operator to hold the operator in the first position, a seismic mass movably mounted on the support, means operatively connecting the mass to the detent means for movement of the detent means to undetented position to release the operator for movement to the second position upon movement of the seismic mass relative to the support, magnetic means exerting a magnetic flux of predetermined strength between the mass and support to retain the seismic mass against movement relative to the support, an acceleration pulse of predetermined amplitude and time moving the seismic mass relative to the support against the flux of the magnetic means, and means for moving the detent means to detented position in engagement with the operator upon axial movement of the operator relative to the support and mass when the operator is in the second position.

3. A sensor comprising, a support including an axial guide, an operator mounted on the guide for axial movement between first and second positions, means biasing the operator to the second position, detent means movable between detented and undetented positions and engageable in detented position with the operator to hold the operator in the first position, a shaped seismic mass, means mounting the seismic mass on the support for movement between a normal position wherein the longitudinal axis of the mass is coaxial with the axis of movement of the operator, and an actuated position wherein the longitudinal axis of the mass is out of coaxial relationship with the axis of movement of the operator, magnetic means exerting a magnetic flux of predetermined strength between the mass and the support to maintain the seismic mass in normal position, an acceleration pulse of predetermined amplitude and time overcoming the magnetic flux and moving the seismic mass to actuated position, and means operatively connecting the seismic mass to the detent means to move the detent to undetented position to release the operator upon movement of the seismic mass to actuated position.

4. An omnidirectional sensor comprising, a support including an axial guide, an operator mounted on the guide for axial movement between first and second positions, means biasing the operator to the second position, detent means movable between detented and undetented positions and engageable in detented position with the operator to hold the operator in the first position, a generally annular seismic mass having a planar end portion seated on a planar portion of the support, the seismic mass being movable between a normal seated position, and an actuated unseated position, magnetic means on the seismic mass exerting a magnetic flux of predetermined strength between the mass and the support maintaining the seismic mass in normal position, an acceleration pulse of predetermined amplitude and time overcoming the magnetic flux and moving the seismic mass to actuated position, and means operatively connecting the seismic mass to the detent means to move the detent means to undetented position to release the operator upon movement of the seismic mass to actuated position.

5. A sensor comprising, a support including an axial guide, an operator mounted on the guide for axial movement between first and second positions, means biasing the operator to the second position, detent means movable between detented and undetented positions and engageable in detented position with the operator to hold the operator in the first position, a seismic mass symmetrical about the axis of movement of the operator and having a planar one end seated on a planar portion of the support, the seismic mass being movable between a normal position wherein the axis of symmetry of the mass is coaxial with the axis of movement of the operator and an actuated position wherein the axis of symmetry of the mass is located at a predetermined included angle to the axis of movement of the operator, magnet means exerting a predetermined strength flux between the mass and support maintaining the seismic mass in normal position, an acceleration pulse of predetermined amplitude and time overcoming the predetermined strength flux and moving the seismic mass to actuated position, means operatively connecting the seismic mass to the detent means to move the detent means to undetented position upon movement of the seismic mass to actuated position, and means limiting movement of the seismic mass to pulses received thereby in predetermined directions with respect to the axis thereof.

6. An omnidirectional sensor comprising, a support including an axial guide, an operator mounted on the guide for movement between first and second positions relative to the support, means biasing the operator to the second position, a plurality of balls mounted on the guide for movement radially thereof into and out of engagement with the operator to selectively and alternately hold the operator in the first position or permit movement to the second position, means blocking movement of the balls out of engagement with the operator, a seismic mass symmetrical about the axis of movement of the operator and having a planar one end seated on a planar portion of the support, the seismic mass being movable between a normal seated position wherein the axis of symmetry of the mass is coaxial with the axis of movement of the operator and an actuated position wherein the axis of symmetry of the mass is located at a predetermined included angle to the axis of movement of the operator, magnet means exerting a predetermined strength flux between the mass and the support maintaining the mass in normal position, an acceleration pulse of predetermined amplitude and time overcoming the predetermined strength flux and moving the mass to actuated position, and means operatively connecting the mass to the blocking means for movement of the blocking means to unblocking position with respect to the balls upon movement of the mass from normal position to actuated position.

7. A sensor comprising, a support including an axial guide, an operator mounted on the guide for movement between first and second positions relative to the support, means biasing the operator to the second position, detent means movable between detented and undetented positions and engageable in detented position with the operator and support to hold the operator in the first position relative to the support, a seismic mass having a planar one end seated on a planar portion of the support, the seismic mass being movable between a normal seated position and an actuated unseated position wherein the planar end of the mass is located at a predetermined included angle to the planar portion of the support, magnet means exerting a predetermined strength flux between the mass and support maintaining the seismic mass in normal seated position, an acceleration pulse of predetermined amplitude and time overcoming the predetermined strength flux and moving the seismic mass to actuated position, means operatively connecting the seismic mass to the detent means for movement of the detent means to undetented position upon movement of the seismic mass from normal position to actuated position, and blocking means movable between unblocking and blocking positions with respect to the mass and operative in blocking position to block movement of the mass to actuated position.

8. A sensor comprising, a support including a hollow axial guide and a radial shoulder, an operator mounted within the guide for axial movement between first and second positions, means biasing the operator to the second position, a plurality of balls mounted on the operator for movement radially thereof between detented and undetented positions and projecting radially outwardly of the operator in detented position for engagement with the support shoulder to hold the operator in the first position, a seismic mass having a planar one end seated on a planar portion of the support, the seismic mass being movable between a normal seated position and an actuated position wherein the planar one end of the mass is located at a predetermined included angle to the planar portion of the support, hollow annular magnet means on the mass exerting a predetermined strength flux between the mass and support maintaining the seismic mass in normal seated position, an acceleration pulse of predetermined amplitude and time overcoming the predetermined strength flux and moving the seismic mass to actuated position, and means on the mass projecting through the annular magnet means and engageable with the balls to hold the balls in engagement with the radial shoulder of the support and maintain the mass in normal position, movement of the mass to actuated position moving the projecting means out of engagement with the balls to permit movement thereof to undetented position.

* * * * *